United States Patent [19]

Drwiega

[11] 4,456,350

[45] Jun. 26, 1984

[54] ARRANGEMENT FOR THE VIEWING PROJECTION OF FRAMED SLIDES

[76] Inventor: Bohdan Drwiega, "L'Eurydice", 231 Ave., Aristide Briand, F 06190 Roquebrune-Cap-Martin, France

[21] Appl. No.: 356,626

[22] Filed: Mar. 10, 1982

Related U.S. Application Data

[63] Continuation-in-part of Ser. No. 138,703, Apr. 9, 1980, abandoned.

[30] Foreign Application Priority Data

Apr. 11, 1979 [DE] Fed. Rep. of Germany ....... 2914833

[51] Int. Cl.³ ..................... G03B 23/10; G03B 21/00
[52] U.S. Cl. ................................ 353/108; 353/27 R; 353/101
[58] Field of Search ................... 353/25, 27 A, 27 R, 353/108, 109, 101

[56] References Cited

U.S. PATENT DOCUMENTS

| | | | |
|---|---|---|---|
| 154,607 | 9/1874 | Holmes | 353/101 |
| 1,889,575 | 11/1932 | Sebille | 353/25 |
| 2,285,768 | 6/1942 | Drucker | 353/101 |
| 2,296,141 | 9/1942 | Brown et al. | 353/25 |
| 2,552,211 | 5/1951 | Perillo | 353/101 |
| 2,740,326 | 4/1956 | Reinebach | 353/108 |
| 2,968,217 | 1/1961 | Ewald | 353/101 |
| 4,076,401 | 2/1978 | Drwiega | 353/108 |

*Primary Examiner*—John W. Shepperd
*Attorney, Agent, or Firm*—Scully, Scott, Murphy & Presser

[57] ABSTRACT

An arrangement for the viewing projection of framed diapositives or slides in which a plurality of slides are supported adjacent each other in the pockets of rigid strips. A light source and a lens of the arrangement are displaceable by a carriage relative to a hollow, open prism formed by the slides which is stationary in the direction of its longitudinal axis.

1 Claim, 3 Drawing Figures

ARRANGEMENT FOR THE VIEWING PROJECTION OF FRAMED SLIDES

This patent application is a continuation-in-part of patent application Ser. No. 138,703 now abandoned for Arrangement For The Viewing Projection Of Framed Lantern Slides, filed Apr. 9, 1980.

BACKGROUND OF THE INVENTION

1. Field of the Invention

The present invention relates to an arrangement for the viewing projection of framed diapositives or slides particularly in which a plurality of slides are supported adjacent each other in the pockets of rigid strips.

2. Discussion of the Prior Art

An arrangement of the above-mentioned type is generally known from the present inventor's earlier U.S. Pat. No. 4,076,401, incorporated by reference herein.

In the known arrangement, a carriage which is adjustable in the direction of the longitudinal axis of a hollow prism supports a revolving head at each end thereof, whereas there is provided a stationary light source and lens. In order to shift from one row of slides to another, the hollow prism is rotated by a corresponding extent about its longitudinal axis. For effectuating a shifting from one slide to another with a row of slides, the carriage is displaced in the longitudinal direction of the hollow prism whereby one slide after another is located in the region intermediate the light source and the lens.

The accomodating of the framed slides in the pockets of rigid strips which are hingedly interconnected along their longitudinal sides, facilitates an extraordinarily satisfactory storage of the slides in which, through blocking of the articulation, there are formed images similar to album pages from a plurality of rigid strips, which are to be stored in a suitable container. On the other hand, the arrangement permits a sequential viewing projection of slides in an extremely comfortable manner, in which the spatial requirements of the arrangement are extraordinarily small. Thereby, each album page can be combined into a closed hollow prism and projected independently of the other album pages, or a plurality of album pages can be hinged to each other so as to presently form an open hollow prism for sequential viewing projection.

Notwithstanding these important advantages, actual practice has shown that the displacement of the hollow prism in the direction of its longitudinal axis through the intermediary of a carriage having two revolving heads signifies the need for a relatively high power input since a relatively large and heavy component must be conveyed over a relatively lengthy distance, and thereby only small tolerances are permissible in order to not adversely influence the sharpness of the picture representation.

SUMMARY OF THE INVENTION

Accordingly, it is an object of the present invention to provide an improved and novel arrangement for the viewing projection of framed slides in which, on the one hand, the light source and, on the other hand, the lens can be moved relative to each other with low power requirements and that, as a result, it is possible to provide an arrangement which is less expensive than the known arrangement but is equal thereto in the quality of its picture projection.

The foregoing object of the invention is attained in that the light source and the lens of the arrangement are displaceable through the carriage relative to a hollow open prism which is stationary in the direction of its longitudinal axis.

It has been shown that the arrangement is essentially more simple and, as a result, can be produced more inexpensively, when the hollow prism is supported as to be rotatable only about its longitudinal axis and in which the light source and lens are adjustable relative to the hollow open prism in the direction of its longitudinal axis. On the one hand, the mass which is displaceable in the longitudinal direction of the hollow prism is lower while, on the other hand, the extent of displacement is not appreciably shortened. All aspects combined, the present invention facilitates the known arrangement to be improved so as to be simplier and less expensive without any substantial loss in quality.

In the inventive arrangement the image which is projected onto a picture screen moves sideways onto the picture screen in conformance with the displacing movement of the lens. This can be taken from the condition when the picture screen has a corresponding oversize with respect to the image which is projected thereon. When this is not the case, then the entire apparatus can be so pivoted about its vertical axis so that the image is projected on the same location on the picture screen, to the same extent the lens has moved in the direction of the longitudinal axis of the hollow prism with respect to a base position. When one does not wish to avail himself of this somewhat basic solution, then a corresponding effect can be achieved in that the lens is pivotable in a corresponding manner about a vertical axis.

BRIEF DESCRIPTION OF THE DRAWINGS

Reference may now be had to a detailed description of preferred embodiments of the invention, taken in conjunction with the accompanying drawings; in which.

DETAILED DESCRIPTION

Figure 1:
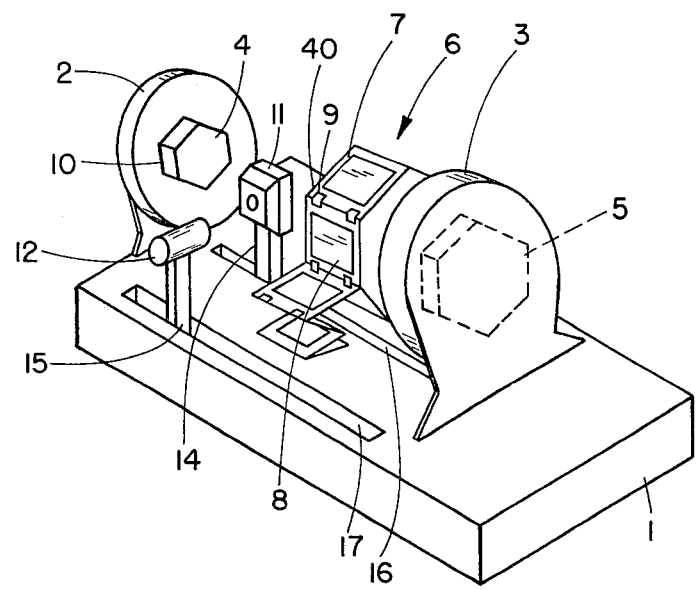
FIG. 1 is a perspective view of an inventive apparatus.
Figure 2:
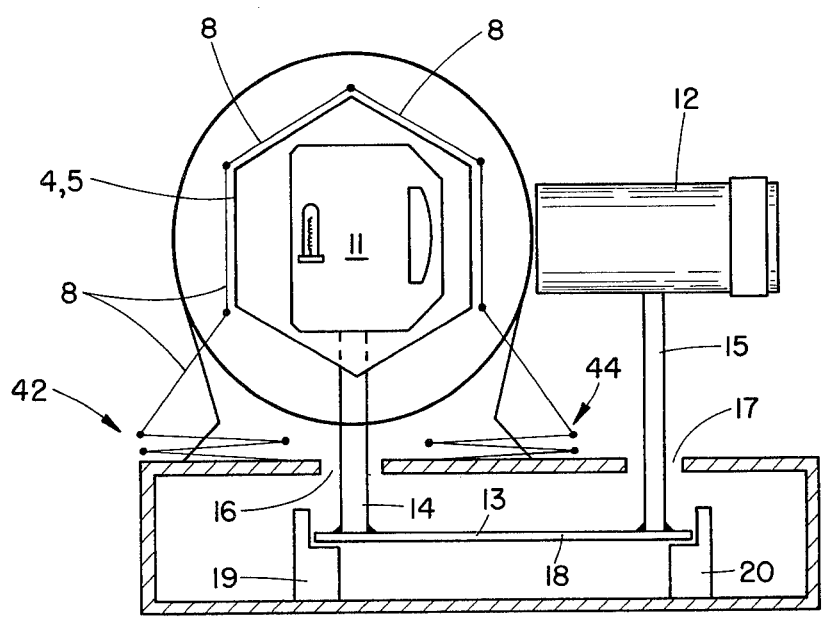
FIG. 2 is a partially sectioned side elevational view of the apparatus of FIG. 1 on an enlarged scale.

Fastened on the upper surface of a box 1 are two bearing pedestals 2, 3 which support revolving heads 4,5 on the sides facing each other. The distance between the bearing pedestals 2,3 or revolving heads 4,5 is selected so that a hollow open prism 6, formed of connected slides, can be positioned on the bearing heads. For the sake of simplicity of illustration, FIG. 1 only illustrates one full column of slides, whereas in practice a plurality of adjacent columns would extend from revolving head 4 to revolving head 5 to be supported thereby, and this is illustrated schematically by the broken line 40 at the side of the column. The open hollow prism consists of individual rigid strips 7 in which there are provided pockets for the receipt of framed slides 8, and the resultant open prism accommodates excessive rows of slides in folded stacks 42 and 44, formed on the upper surface of base 1, as illustrated in FIG. 2. Each strip receives a row of slides, and the strips are hingedly interconnected along their longitudinal sides with detachable hinges 9. In the exemplary embodiment, each revolving head 4,5 has six support surfaces 10. Naturally, in this embodiment a suitable number of strips can be hinged to each other which are conducted away over the revolving heads as a continuous chain and which form an open hollow prism, as illustrated in FIGS. 1 and 2. At least one of the revolving heads is positively drivable so as to be driven about its longitudinal axis, conveying the strips and thereby taking along the other revolving head when the latter is not synchronously driven with its own drive. For purposes of storage, a suitable number of strips have their articulability taken away at their ends through bars attached thereon, so as to be able to be stored in the type of album pages, as is described in detail in U.S. Pat. No. 4,076,401.

Located approximately in the middle intermediate the revolving heads, within the hollow prism, is a light source 11 and ahead thereof a lens 12, with the interposition of a slide. Lens 12 and light source 11 are fastened on a common carriage 13, which is guided in the box 1 and is displaceable in the direction of the longitudinal axis of the hollow prims 6. This displacement is preferably effected through a drive motor (not shown). Light source 11 and lens 12 are each seated on a post 14, 15; both posts extend through slots 16,17 formed in the upper surface into the interior of box 1, are interconnected at their lower ends through a plate 18, and this plate 18 is supported on guides 19,20 and conveyed thereon.

Figure 3:
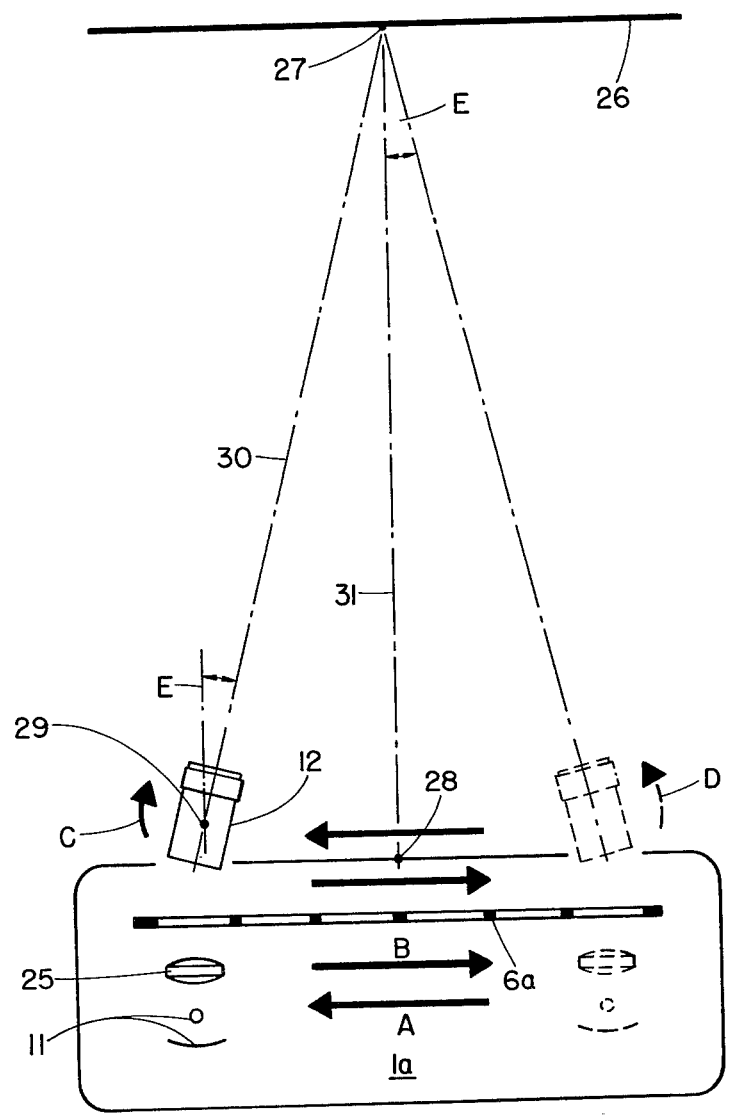
FIG. 3 is a diagrammatic illustration elucidating the detailed construction of the invention.

The problem of reproducing the images unchanged at the same location on a picture screen notwithstanding the movement of the carriage 13 in the direction of the longitudinal axis of the hollow prism 6 can be ascertained from FIG. 3.

With respect to the base plate 1a, which corresponds to the box 1 in FIGS. 1 and 2, there are commonly displaceable the lens 12, the light source 11 with a combination formed of a lamp and a mirror reflector and a focusing lens 25 arranged therebetween, in the direction of arrows A and B, in that they are mounted on a carriage, as has already been described hereinabove. The slides which are to be projected on the picture screen 26 are combined into a row 6a of slides which is not displaceable relative to the directions of arrows A and B. The area of the desired image projection on the picture screen 26 is identified through its centerpoint 27. This point lies ahead of the middle of the movements of the carriage in the direction of the arrows A and B, in essence, the lens is movable from the point 28, which lies with the point 27 in a plane perpendicular to the direction of movement, by equal amounts in the direction of the arrows A and B. Pursuant to the sidewise displacement of the lens 12, this is now so pivoted about its vertical axis 29 in the direction of the arrow C or arrow D, whereby its centerline 30 crosses unchanged the point 27. Up to an angle E of 4° between the centerline 30 and the connecting line 31 between the points 27 and 28 there can be figured with a troublefree image representation which normally is adequate for expected room requirements, although the measure of the displacement depends upon the room size and need not even be utilized in large rooms.

What is claimed is:

1. An arrangement for the viewing projection of framed slides, comprising: a plurality of rigid strips, each strip having a plurality of pockets for storing said slides adjacent to each other; means hingedly interconnecting a plurality of said rigid strips along their longitudinal sides to form a two dimensional array of slides in a hollow open prism, having a longitudinal axis, for projection of an image of said slides; means for rotating said hollow prism about its longitudinal axis, including a revolving head at each end of said hollow prism having support surfaces for the sides of said prism; said hollow prism being stationarily mounted relative to its longitudinal axis; a light source positioned interiorly of said open prism; a lens arranged ahead of said light source so as to have a slide interposed between said lens and said light source; and carriage means movably carrying said light source and said lens in the direction of the longitudinal axis of said hollow prism so as to be positionally adjustable in that direction relative to the stationarily mounted hollow prism, and rotatable mounting means for mounting said lens on said carriage means for rotation about an axis which is substantially perpendicular to the longitudinal axis of said hollow prism to allow rotation of the projection direction of the lens.

* * * * *